(12) United States Patent
Juan et al.

(10) Patent No.: US 11,094,056 B2
(45) Date of Patent: Aug. 17, 2021

(54) DEFECT INSPECTION METHOD FOR SENSOR PACKAGE STRUCTURE

(71) Applicant: KINGPAK TECHNOLOGY INC., Hsin-Chu County (TW)

(72) Inventors: Yi-Cheng Juan, Hsin-Chu County (TW); Han-Hsing Chen, Hsin-Chu County (TW)

(73) Assignee: KINGPAK TECHNOLOGY INC., Hsin-Chu County (TW)

( * ) Notice: Subject to any disclaimer, the term of this patent is extended or adjusted under 35 U.S.C. 154(b) by 0 days.

(21) Appl. No.: 16/862,731

(22) Filed: Apr. 30, 2020

(65) Prior Publication Data

US 2021/0150689 A1    May 20, 2021

Related U.S. Application Data

(60) Provisional application No. 62/935,110, filed on Nov. 14, 2019.

(30) Foreign Application Priority Data

Dec. 31, 2019 (TW) .................................. 108148683

(51) Int. Cl.
*G06K 9/00* (2006.01)
*G06T 7/00* (2017.01)
*G06T 7/30* (2017.01)

(52) U.S. Cl.
CPC ................ *G06T 7/001* (2013.01); *G06T 7/30* (2017.01); *G06T 2207/10152* (2013.01); *G06T 2207/30108* (2013.01)

(58) Field of Classification Search
CPC . G06T 7/001; G06T 7/30; G06T 2207/30108; G06T 2207/10152
See application file for complete search history.

(56) References Cited

U.S. PATENT DOCUMENTS

2017/0323435 A1* 11/2017 Minekawa .............. G06T 7/001
2018/0225816 A1*  8/2018 Schweid ............. G06K 9/6284
2019/0228515 A1*  7/2019 Xi ......................... G06T 7/0008

OTHER PUBLICATIONS

Real-time Defect Detection Method for Printed Images Based on Grayscale and Gradient Differences Wang Yangping, Xu Shaowei (Year: 2018).*

* cited by examiner

*Primary Examiner* — Dhaval V Patel
(74) *Attorney, Agent, or Firm* — Li & Cai Intellectual Property (USA) Office

(57) ABSTRACT

A defect inspection method for a sensor package structure includes: using an image capture device to separately focus on and take pictures of at least three to-be-inspected regions of the sensor package structure along a height direction, so as to respectively obtain a defect image from one of the to-be-inspected regions, wherein the defect images are aligned with each other along the height direction and have different grayscale values; determining the defect image having a maximum grayscale value as a reference defect image, and defining any of the remaining defect images as a to-be-confirmed defect image; multiplying the maximum grayscale value by a predetermined grayscale ratio to obtain a predicted grayscale value, and confirming whether a difference between the to-be-confirmed and predicted grayscale values falls within an error range.

10 Claims, 4 Drawing Sheets providing a sensor package structure having a plurality of to-be-inspected regions arranged at different levels along a height direction, wherein the number of the to-be-inspected regions is equal to or greater than three

↓ implementing an image-capturing step by using an image capture device to separately focus on and take pictures of the to-be-inspected regions, so as to respectively obtain image information from each of the to-be-inspected regions, wherein a grayscale ratio is defined by any two of the image information, each image information contains has a defect image, and the defect images from the to-be-inspected regions are aligned with each other along the height direction and respectively have different grayscale values

↓ implementing a first determination step by determining the defect image having a maximum grayscale value as a reference defect image, defining the image information having the reference defect image as a reference image information, and defining each of the remaining defect images and the corresponding image information as a to-be-confirmed defect image and a to-be-confirmed image information

↓ implementing a second determination step by comparing the reference image information and any one of the to-be-confirmed image information, which is carried out by multiplying the maximum grayscale value with the corresponding grayscale ratio to obtain a predicted grayscale value, and then confirming whether a difference between the grayscale value of the to-be-confirmed defect image and the predicted grayscale value falls within an error range, wherein when the difference falls within the error range, the to-be-confirmed defect image is determined as containing a pseudo defect, and wherein when the difference does not fall within the error range, the to-be-confirmed defect image is determined as containing a true defect

FIG. 4

DEFECT INSPECTION METHOD FOR SENSOR PACKAGE STRUCTURE

CROSS-REFERENCE TO RELATED PATENT APPLICATION

This application claims the benefit of priority to Taiwan Patent Application No. 108148683, filed on Dec. 31, 2019. The entire content of the above-identified application is incorporated herein by reference.

This application claims priority from the U.S. Provisional Patent Application Ser. No. 62/935,110 filed Nov. 14, 2019, which application is incorporated herein by reference in its entirety.

FIELD OF THE DISCLOSURE

The present disclosure relates to an inspection method, and more particularly to a defect inspection method for a sensor package structure.

BACKGROUND OF THE DISCLOSURE

A conventional method for inspecting a sensor package structure can be implemented by capturing an image of the sensor package structure and then confirming whether there is any defect (e.g., a particle) in the image. However, the sensor package structure has a plurality of surfaces arranged along a height direction, and a defect on any one of the surfaces may reflect light onto any of other surfaces to form a pseudo defect which may be erroneously judged as a real defect by the inspection method.

SUMMARY OF THE DISCLOSURE

In response to the above-referenced technical inadequacies, the present disclosure provides a defect inspection method for a sensor package structure to effectively improve on the issues associated with conventional inspection methods.

In one aspect, the present disclosure provides a defect inspection method for a sensor package structure. The defect inspection method includes the following steps: providing a sensor package structure having a plurality of to-be-inspected regions arranged at different levels along a height direction, wherein the number of the to-be-inspected regions is equal to or greater than three; implementing an image-capturing step by using an image capture device to separately focus on and take pictures of the to-be-inspected regions so as to respectively obtain image information from each of the to-be-inspected regions, wherein a grayscale ratio is defined by any two of the image information, each image information contains a defect image, and the defect images from the to-be-inspected regions align along the height direction and respectively have different grayscale values; implementing a first determination step by determining the defect image having a maximum grayscale value as a reference defect image, defining the image information having the reference defect image as a reference image information, and defining each of the remaining defect images and the corresponding image information as an to-be-confirmed defect image and an to-be-confirmed image information; and implementing a second determination step by comparing the reference image information and any one of the to-be-confirmed image information, which is carried out by multiplying the maximum grayscale value with the corresponding grayscale ratio to obtain a predicted grayscale value, and then confirming whether a difference between the grayscale value of the to-be-confirmed defect image and the predicted grayscale value falls within an error range, wherein when the difference falls within the error range, the to-be-confirmed defect image is determined as containing a pseudo defect, and wherein when the difference does not fall within the error range, the to-be-confirmed defect image is determined as containing a true defect.

Therefore, the defect inspection method of the present disclosure can be implemented by using the image capture device to respectively focus on and take pictures of the to-be-inspected regions of the sensor package structure, so that the grayscale ratios corresponding to the image information from the to-be-inspected regions can be used to determine whether each of the defects located on the to-be-inspected regions along the height direction is a pseudo defect or a true defect.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 4 is a flow chart of a defect inspection method for a sensor package structure according to the present disclosure.

DETAILED DESCRIPTION OF THE EXEMPLARY EMBODIMENTS

Referring to FIG. 1 to FIG. 4, an embodiment of the present disclosure provides a defect inspection method for a sensor package structure 2. To clearly illustrate the defect inspection method of the present embodiment, the following description describes an inspection apparatus 1 that is used to implement the defect inspection method, but the present disclosure is not limited thereto.

Figure 1:
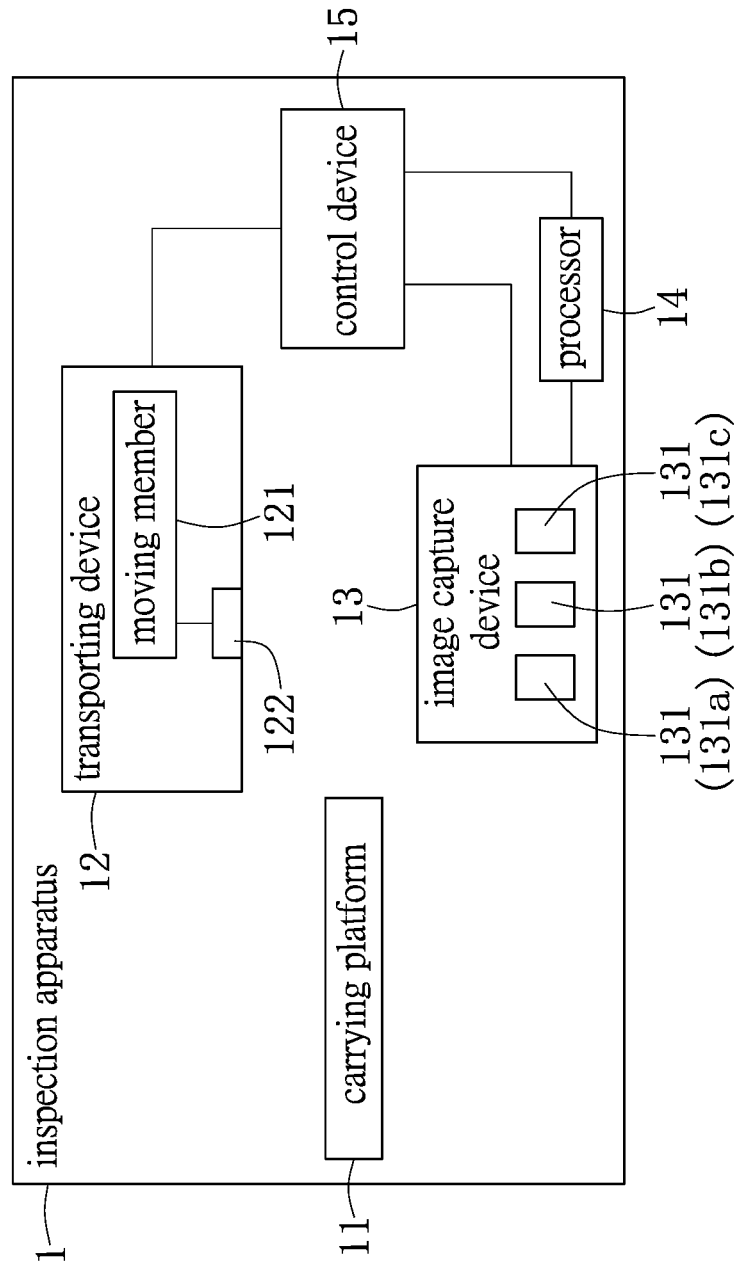
FIG. 1 is a functional block view of an inspection apparatus according to the present disclosure.
Figure 2:
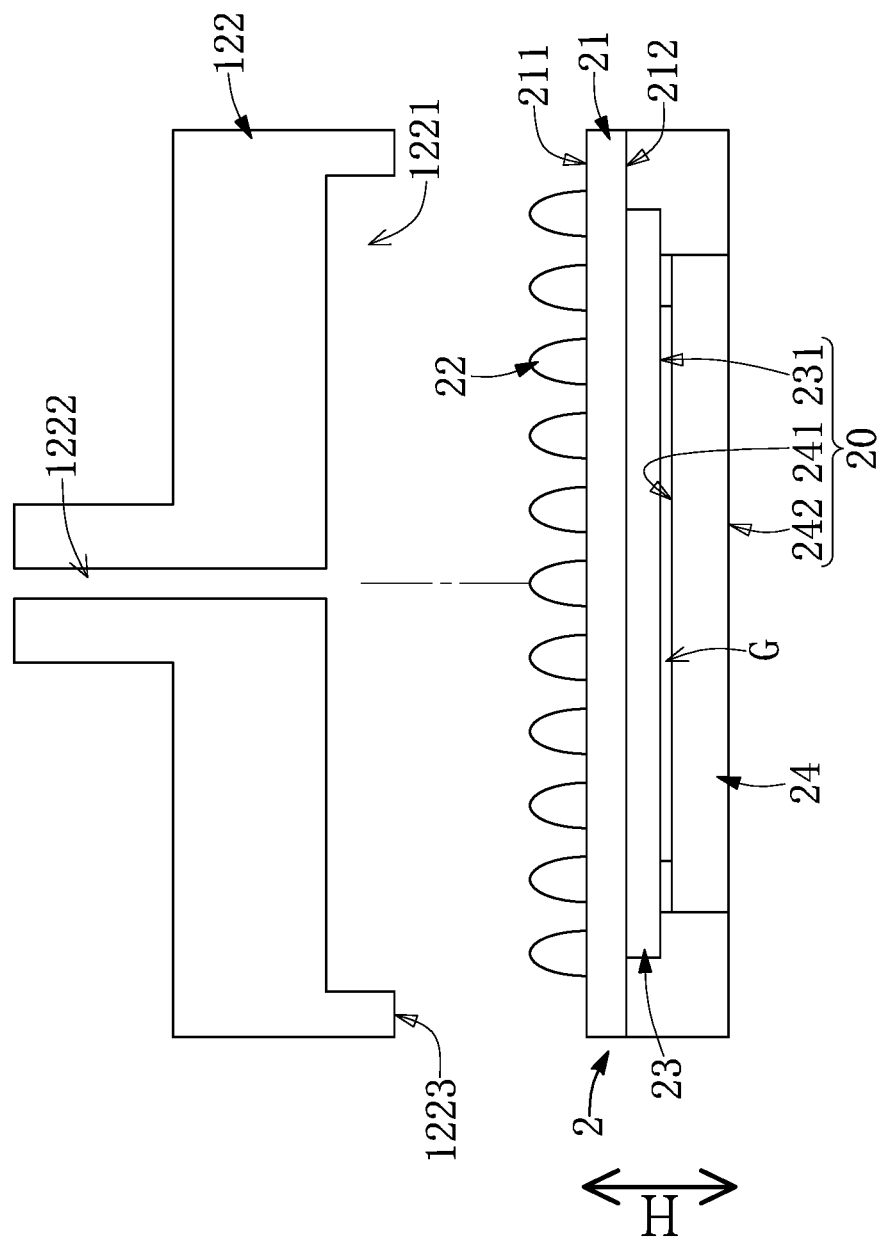
FIG. 2 is an exploded view showing a carrying member and a sensor package structure according to the present disclosure.
Figure 3:
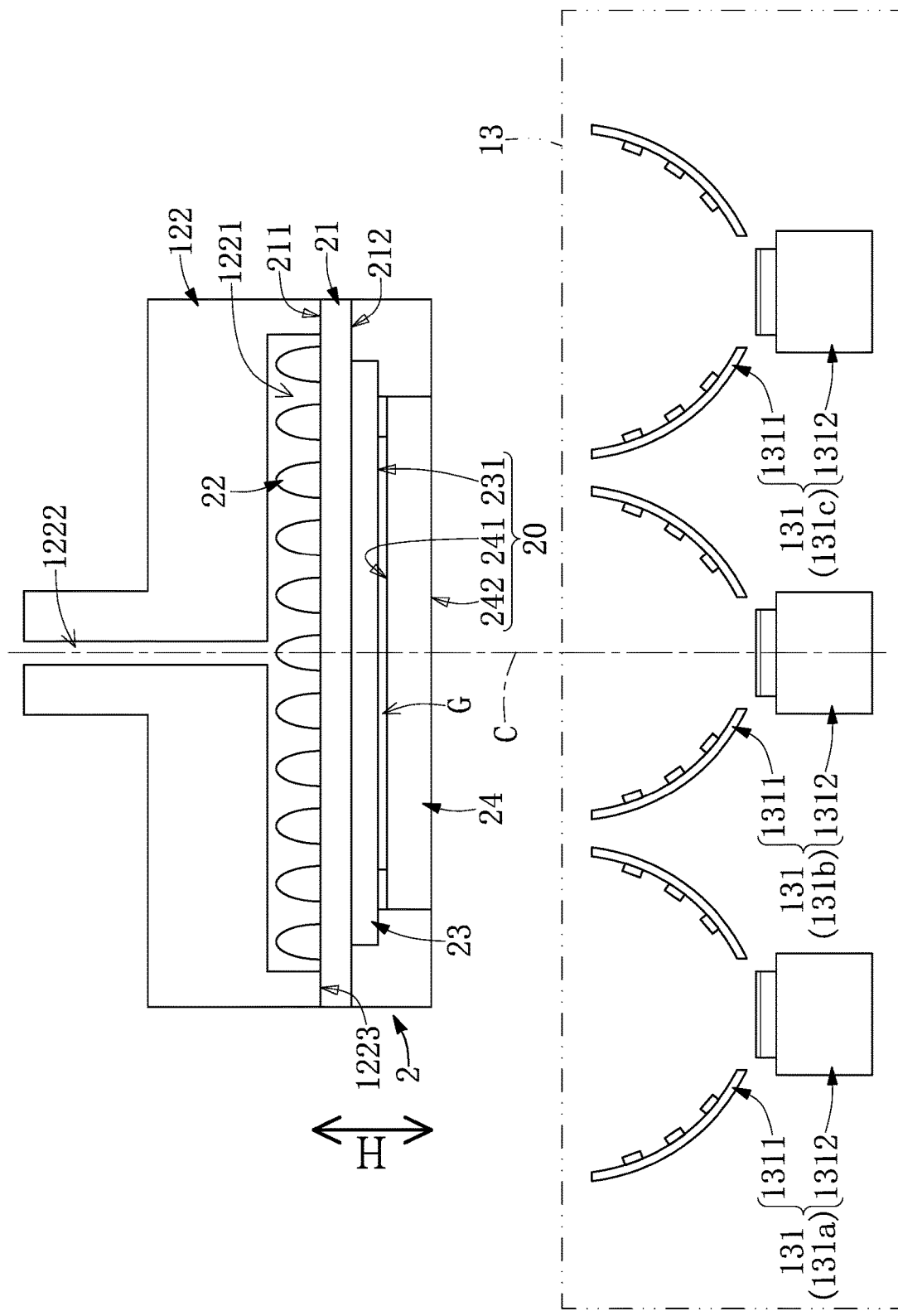
FIG. 3 is an exploded view showing the sensor package structure being suctioned by the carrying member and corresponding in position to the image capture device according to the present disclosure.

As shown in FIG. 1 to FIG. 3, the inspection apparatus 1 includes a carrying platform 11, a transporting device 12, an image capture device 13, a processor 14, and a control device 15. The carrying platform 11 is configured to allow a plurality of sensor package structures 2 to be disposed thereon. The transporting device 12 is capable of transporting at least one of the sensor package structures 2 from the carrying platform 11 to a position opposite to the image capture device 13 which is then used for inspecting the at least one sensor package structure 2. The processor 14 is electrically connected to the image capture device 13, and the processor 14 is configured to receive and compare image information obtained from the image capture device 13. The control device 15 is electrically connected to the transporting device 12, the image capture device 13, and the processor 14, thereby driving the transporting device 12, the image capture device 13, and the processor 14. It should be noted that the present embodiment discloses only a part of the inspection apparatus 1, and the specific structure of the inspection apparatus 1 may be modified according to different design requirements and is not limited to that disclosed in the present embodiment.

The sensor package structure 2 in the present embodiment includes a substrate 21, a plurality of solder balls 22 mounted on a bottom surface 211 of the substrate 21, a sensor chip 23 mounted on a top surface 212 of the substrate 21, and a transparent board 24 corresponding in position to the sensor chip 23. The sensor package structure 2 includes a plurality of to-be-inspected (hereinafter "TBI") regions 20 respectively located at different levels. The TBI regions 20 of the present embodiment are parallel planes perpendicular to a height direction H.

Specifically, the TBI regions 20 of the present embodiment include an image sensing region 231 of the sensor chip 23, an inner surface 241 of the transparent board 24 arranged adjacent to the image sensing region 231, and an outer surface 242 of the transparent board 24 arranged away from the image sensing region 231, but the sensor package structure 2 and the TBI regions 20 are not limited thereto. Moreover, a gap G within a range of 100 μm-150 μm exists between the image sensing region 231 and the inner surface 241 of the transparent board 24, and a medium in the gap G is air. A distance from the inner surface 241 to the outer surface 242 is within a range of 300 μm-500 μm.

The transporting device 12 includes a moving member 121 and at least one carrying member 122 assembled to the moving member 121. The moving member 121 is configured to drag the carrying member 122 and enable the carrying member 122 to move between the carrying platform 11 and the image capture device 13. The moving member 121 in the present embodiment can be a mechanism using rails or a robot arm, but the present disclosure is not limited thereto.

Moreover, while the carrying member 122 in the present embodiment is illustrated as a structure capable of sucking the sensor package structure 2, the structure of the carrying member 122 is not limited thereto. For example, in other embodiments not shown in the present disclosure, the carrying member 122 can be a structure capable of clutching the sensor package structure 2 and being rotatable within a range of at least 180 degrees to make the sensor package structure 2 face different directions (such as to face the image capture device 13).

Specifically, the carrying member 122 in the present embodiment is a vacuum nozzle, and an inner side of the carrying member 122 forms a solder ball receiving space 1221. The solder ball receiving space 1221 is in spatial communication with an airflow channel 1222 of the carrying member 122, and a depth of the solder ball receiving space 1221 is preferably greater than a diameter of each of the solder balls 22 of the sensor package structure 2. In other words, when the carrying member 122 holds the sensor package structure 2 therein by suction, the solder balls 22 of the sensor package structure 2 are located in the solder ball receiving space 1221 of the carrying member 122, and an end surface 1223 of the carrying member 122 abuts against the bottom surface 211 of the substrate 21 of the sensor package structure 2.

The transporting device 12 can include a rotating mechanism (not shown) which may be used to rotate the sensor package structure 2 and make the bottom surface 211 of the substrate 21 face upward. For example, when the bottom surface 211 of the substrate 21 of the sensor package structure 2 does not face upward, in order to enable the carrying member 122 to easily suck the bottom surface 211 of the substrate 21, the sensor package structure 2 is rotated (through using the rotating mechanism) within a range of at least 180 degrees, thereby facing different directions (such as facing the image capture device 13).

The image capture device 13 includes a plurality of image-capturing modules 131, and the number of the image-capturing modules 131 is preferably equal to that of the TBI regions 20 of the sensor package structure 2, but the present disclosure is not limited thereto. The image-capturing modules 131 are configured to respectively focus on and take pictures of the TBI regions 20 of the sensor package structure 2 so as to obtain image information from each of the TBI regions 20. The processor 14 is configured to receive and compare the image information obtained from the image-capturing modules 131.

Specifically, each of the image-capturing modules 131 includes a multi-layer annular light source 1311 and a camera 1312 that is located on a central axis C of the multi-layer annular light source 1311. The multi-layer annular light source 1311 is configured to emit light toward the sensor package structure 2, and the camera 1312 is configured to take a picture of the TBI region 20 in focus.

The control device 15 is electrically connected to the carrying member 122 and the image capture device 13. The control device 15 is configured to drive the carrying member 122 to hold the sensor package structure 2 by suction, and is configured to drive the carrying member 122 and the image capture device 13 to move relative to each other so that the image-capturing modules 131 can be used to respectively focus on and take pictures of the TBI regions 20 of the sensor package structure 2.

The inspection apparatus 1 of the present embodiment has been disclosed in the above description, and the following description describes the defect inspection method that is implemented by using the inspection apparatus 1, but the present disclosure is not limited thereto (e.g., the defect inspection method can be implemented by using other inspection apparatuses). Moreover, details related to the structure of the inspection apparatus 1 will not be repeated again in the following description.

As shown in FIG. 1 to FIG. 4, the defect inspection method of the present embodiment includes an image-capturing step, a first determination step, and a second determination step. The image-capturing step in the present embodiment is implemented by using the transporting device 12 and the control device 15, and the first determination step and the second determination step are implemented by using the image capture device 13 and the processor 14, but the present disclosure is not limited thereto.

The image-capturing step is implemented by using the image capture device 13 to focus on and take pictures of the TBI regions 20 so as to obtain image information from each of the test regions 20. Moreover, a grayscale ratio is defined by any two of the image information that is described in the following description. Specifically, the image information from each of the TBI regions 20 has a defect image, and the defect images from the TBI regions 20 are aligned with each other along the height direction H and respectively have different grayscale values.

The sensor package structure 2 or the image-capturing modules 131 can be moved (e.g., the sensor package structure 2 and the image-capturing modules 131 can be moved relative to each other by the transporting device 12), so that the sensor package structure 2 can be aligned with the image-capturing modules 131 sequentially, and the image-capturing modules 131 can obtain the image information by respectively focusing on and taking pictures of the TBI regions 20 (e.g., the image-capturing module 131a can focus on and take a picture of the image sensing region 231, the image-capturing module 131b can focus on and take a picture of the inner surface 241 of the transparent board 24, and the image-capturing module 131c can focus on and take a picture of the outer surface 242 of the transparent board 24). When the sensor package structure 2 is moved to align with anyone of the image-capturing modules 131, the TBI regions 20 are located on the central axis C of the multi-layer annular light source 1311, the multi-layer annular light source 1311 emits light toward the sensor package structure 2, and the camera 1312 takes pictures of the TBI region 20 in focus.

The first determination step is implemented by determining the defect image having a maximum grayscale value as a reference defect image (i.e., a true defect image), defining the image information having the reference defect image as a reference image information, and defining each of the remaining defect images and the corresponding image information as a to-be-confirmed (hereinafter "TBC") defect image and an TBC image information.

Specifically, when a defect exists on the outer surface 242 of the transparent board 24 (i.e., an image, taken from the outer surface 242, containing a true defect), the defect is illuminated and may reflect light onto the image sensing region 231 and the inner surface 241 of the transparent board 24 along a vertical direction (e.g., the height direction) so as to form defect images on the image sensing region 231 and the inner surface 241. However, along the vertical direction, the defect images from the outer surface 242, from the image sensing region 231, and from the inner surface 241 respectively have different grayscale values. The grayscale value of the defect image from the outer surface 242 and the grayscale value of the defect image from the image sensing region 231 can jointly define one grayscale ratio, and the grayscale value of the defect image from the outer surface 242 and the grayscale value of the defect image from the inner surface 241 can jointly define another grayscale ratio. If the grayscale value of the defect image obtained from the outer surface 242 is greater than those obtained from the image sensing region 231 and from the inner surface 241, the defect image obtained from the outer surface 242 would be defined as the reference defect image, and the image information having the reference defect image would be defined as a reference image information. The defect images from the image sensing region 231 and from the inner surface 241 are defined as the TBC defect images. Specifically, when the reference image information is obtained from the outer surface 242 of the transparent board 24, a ratio of the grayscale values between the outer surface 242 and the inner surface 241 of the transparent board 24 is within a range of 41.32%-87.73%, and a ratio of the grayscale values between the outer surface 242 of the transparent board 24 and the image sensing region 231 is within a range of 33.33%-62.22%.

Similarly, when the reference image information is obtained from the inner surface 241 of the transparent board 24, a ratio of the grayscale values between the inner surface 241 and the outer surface 242 of the transparent board 24 is within a range of 51.98%-87.73%, and a ratio of the grayscale values between the inner surface 241 of the transparent board 24 and the image sensing region 231 is within a range of 79.13%-98.02%.

Moreover, when the reference image information is obtained from the image sensing region 231, a ratio of the grayscale values between the image sensing region 231 and the inner surface 241 of the transparent board 24 is within a range of 90.47%-99%, and a ratio of the grayscale values between the image sensing region 231 and the outer surface 242 of the transparent board 24 is within a range of 56.97%-93.54%.

The second determination step is implemented by comparing the reference image information and any one of the TBC image information. Specifically, the maximum grayscale value is multiplied by the corresponding grayscale ratio to obtain a predicted grayscale value, and a difference between the grayscale value of the TBC defect image and the predicted grayscale value is then determined whether the difference falls within an error range.

Moreover, when the difference falls within the error range, the TBC defect image is determined as a pseudo defect image, and when the difference does not fall within the error range, the TBC defect image is determined as a true defect image. In the present embodiment, when the reference image information and any one of the TBC image information are compared, the difference is an absolute value, the error range is M % of the predicted grayscale value, and M is within a range of 20-30.

The defect inspection method of the present embodiment has been disclosed in the above description, and the following description provides an example for further describing the defect inspection method, but the present disclosure is not limited thereto.

For example, if the defect inspection method of the present embodiment is implemented to inspect the sensor package structure 2 having a predetermined size, the ratio of the grayscale values between the image information from the inner surface 241 and the outer surface 242 of the transparent board 24 is 66%, the reference image information is obtained from the inner surface 241 of the transparent board 24, and the maximum grayscale value of the reference defect image is 137, a TBC image information obtained from the outer surface 242 of the transparent board 24 has an TBC defect image that has a grayscale value of 93, and M is 25.

According to above assumption, the predicted grayscale value is calculated by the following formula: 137×66%=90, the difference is calculated by the following formula: 93−90=3, and the error range is calculated by the following formula: 90×25%=22.5. Furthermore, the difference falls within the error range (i.e., 3<22.5), so that the TBC defect image is determined as a pseudo defect image. In other words, the TBC defect image is formed by the bokeh phenomenon that is caused by the reference defect image.

In conclusion, the defect inspection method of the present disclosure can be implemented by using the image capture device to respectively focus on and take pictures of the to-be-inspected regions of the sensor package structure, so that the grayscale ratios corresponding to the image information from the to-be-inspected regions can be used to determine whether each of the defects located on the to-be-inspected regions along the height direction is a pseudo defect or a true defect.

The foregoing description of the exemplary embodiments of the disclosure has been presented only for illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A defect inspection method for a sensor package structure, comprising:
    providing a sensor package structure having a plurality of to-be-inspected regions arranged at different levels along a height direction, wherein the number of the to-be-inspected regions is equal to or greater than three;
    implementing an image-capturing step by using an image capture device to separately focus on and take pictures of the to-be-inspected regions, so as to respectively obtain image information from each of the to-be-inspected regions, wherein a grayscale ratio is defined by any two of the image information, each image information contains has a defect image, and the defect images from the to-be-inspected regions are aligned with each other along the height direction and respectively have different grayscale values;
    implementing a first determination step by determining the defect image having a maximum grayscale value as a reference defect image, defining the image information having the reference defect image as a reference image information, and defining each of the remaining defect images and the corresponding image information as a to-be-confirmed defect image and a to-be-confirmed image information; and
    implementing a second determination step by comparing the reference image information and any one of the to-be-confirmed image information, which is carried out by multiplying the maximum grayscale value with the corresponding grayscale ratio to obtain a predicted grayscale value, and then confirming whether a difference between the grayscale value of the to-be-confirmed defect image and the predicted grayscale value falls within an error range, wherein when the difference falls within the error range, the to-be-confirmed defect image is determined as containing a pseudo defect, and wherein when the difference does not fall within the error range, the to-be-confirmed defect image is determined as containing a true defect.

2. The defect inspection method according to claim 1, wherein during the step of comparing the reference image information and any one of the to-be-confirmed image information, the difference is an absolute value, the error range is M % of the predicted grayscale value, and M is within a range of 20-30.

3. The defect inspection method according to claim 2, wherein the sensor package structure includes a substrate, a plurality of solder balls mounted on a bottom surface of the substrate, a sensor chip mounted on a top surface of the substrate, and a transparent board corresponding in position to the sensor chip, and wherein the to-be-inspected regions include an image sensing region of the sensor chip, an inner surface of the transparent board arranged adjacent to the image sensing region, and an outer surface of the transparent board arranged away from the image sensing region.

4. The defect inspection method according to claim 3, wherein when the reference image information is obtained from the outer surface of the transparent board, a ratio of the grayscale values between the outer surface and the inner surface of the transparent board is within a range of 41.32%-87.73%, and a ratio of the grayscale values between the outer surface of the transparent board and the image sensing region is within a range of 33.33%-62.22%.

5. The defect inspection method according to claim 3, wherein when the reference image information is obtained from the inner surface of the transparent board, a ratio of the grayscale values between the inner surface and the outer surface of the transparent board is within a range of 51.98%-87.73%, and a ratio of the grayscale values between the inner surface of the transparent board and the image sensing region is within a range of 79.13%-98.02%.

6. The defect inspection method according to claim 3, wherein when the reference image information is obtained from the image sensing region, a ratio of the grayscale values between the image sensing region and the inner surface of the transparent board is within a range of 90.47%-99%, and a ratio of the grayscale values between the image sensing region and the outer surface of the transparent board is within a range of 56.97%-93.54%.

7. The defect inspection method according to claim 3, wherein a gap within a range of 100 μm-150 μm exists between the image sensing region and the inner surface of the transparent board, and a medium in the gap is air, and wherein a distance from the inner surface to the outer surface is within a range of 300 μm-500 μm.

8. The defect inspection method according to claim 1, wherein the to-be-inspected regions are parallel planes perpendicular to the height direction.

9. The defect inspection method according to claim 1, wherein the image capture device includes a plurality of image-capturing modules, wherein in the image-capturing step, the sensor package structure or each of the image-capturing modules is moved so as to sequentially align the sensor package structure with the image-capturing modules, and the image-capturing modules obtain the image information by respectively focusing on and taking pictures of the to-be-inspected regions.

10. The defect inspection method according to claim 9, wherein each of the image-capturing modules includes a multi-layer annular light source and a camera located on a central axis of the multi-layer annular light source, wherein in the image-capturing step, when the sensor package structure is moved to align with anyone of the image-capturing modules, the to-be-inspected regions are located on the central axis, the multi-layer annular light source emits light toward the sensor package structure, and the camera takes a picture of the to-be-inspected region in focus.

* * * * *